United States Patent [19]
Jung

[11] Patent Number: 5,717,470
[45] Date of Patent: *Feb. 10, 1998

[54] METHOD AND APPARATUS FOR DETECTING OPTIMUM MOTION VECTORS BASED ON A HIERARCHICAL MOTION ESTIMATION APPROACH

[75] Inventor: Hae-Mook Jung, Seoul, Rep. of Korea

[73] Assignee: Daewoo Electronics, Co., Ltd., Seoul, Rep. of Korea

[*] Notice: The term of this patent shall not extend beyond the expiration date of Pat. No. 5,583,580.

[21] Appl. No.: 560,785

[22] Filed: Nov. 21, 1995

[30] Foreign Application Priority Data

Sep. 15, 1995 [KR] Rep. of Korea ............ 95-30217

[51] Int. Cl.$^6$ ............................ H04N 7/30; H04N 7/32
[52] U.S. Cl. ............................ 348/699; 348/416
[58] Field of Search ............................ 348/699, 416, 348/408, 407, 413, 402, 415, 412, 409; H04N 7/32, 7/30

[56] References Cited

U.S. PATENT DOCUMENTS

| | | | |
|---|---|---|---|
| 5,327,232 | 7/1994 | Kim | 348/699 |
| 5,351,095 | 9/1994 | Kerdranvat | 348/699 |
| 5,387,947 | 2/1995 | Shin | 348/699 |
| 5,440,350 | 8/1995 | Golin | 348/699 |
| 5,477,272 | 12/1995 | Zhang et al. | 348/699 |
| 5,477,278 | 12/1995 | Kitaura et al. | 348/699 |
| 5,486,863 | 1/1996 | Auyeung et al. | 348/415 |
| 5,510,856 | 4/1996 | Jung | 348/699 |
| 5,537,155 | 7/1996 | O'connell et al. | 348/699 |

(List continued on next page.)

OTHER PUBLICATIONS

"A Hierarchical Method For Detection of Moving Objects", Xiong et al, IEEE 1994, pp. 795-799.

"A New Motion Compensation Method for Image Sequence Coding Using Hierarchical Grid Interpolation", IEEE Trans. on Cir. and Sys. for Video Technology, vol. 4, No. 1, Feb. 1994, pp. 42-52.

"A New Three-Step Search Algorithm for Block Motion Estimation", Li et al, IEEE Trans. on Cir. and Sys. for Video Technology, vol. 4, No. 4, Aug. 1994, pp. 438-442.

"Adaptive Multiple-Candidate Hierarchical Search for Block Matching Algorithm", Electronics Letters, Sep. 14, 1995, vol. 31, No. 19, pp. 1637-1639.

Primary Examiner—Tommy P. Chin
Assistant Examiner—Vu Le
Attorney, Agent, or Firm—Pennie & Edmonds, LLP

[57] ABSTRACT

Motion vectors are determined between a current frame and a preceding frame within a frame duration by employing a multi-tier hierarchical motion estimation approach, wherein the candidate blocks are grouped into a multiple number of hierarchical search areas. Candidate blocks contained in a search area of a highest hierarchy are examined first to check if a minimum mean square error (MSE) between the candidate blocks and the search block is smaller than a predetermined threshold. If the minimum MSE meets the requirement, the position vector of the corresponding candidate block is determined as the motion vector of the search block; or else, candidate blocks contained in a next hierarchy are processed. To find a motion vector of the search block, different requirements are imposed on the search areas of remaining hierarchies. One of the requirements is that a MSE value for a motion vector should be smaller than a reference error function which is defined as a minimum among MSE values of predetermined candidate blocks. The other requirement is that the minimum MSE value of a currently processed hierarchy is much smaller than the minimum MSE of higher hierarchies; or a minimum MSE value increases twice consecutively between 3 adjacent hierarchies. The procedure continues until a motion vector which meets the requirements is found or all hierarchies are processed.

12 Claims, 6 Drawing Sheets

U.S. PATENT DOCUMENTS

| | | | |
|---|---|---|---|
| 5,546,129 | 8/1996 | Lee | 348/699 |
| 5,557,341 | 9/1996 | Weiss et al. | 348/699 |
| 5,561,475 | 10/1996 | Jung | 348/699 |
| 5,579,050 | 11/1996 | Jung | 348/699 |
| 5,581,308 | 12/1996 | Lee | 348/699 |
| 5,583,580 | 12/1996 | Jung | 348/699 |

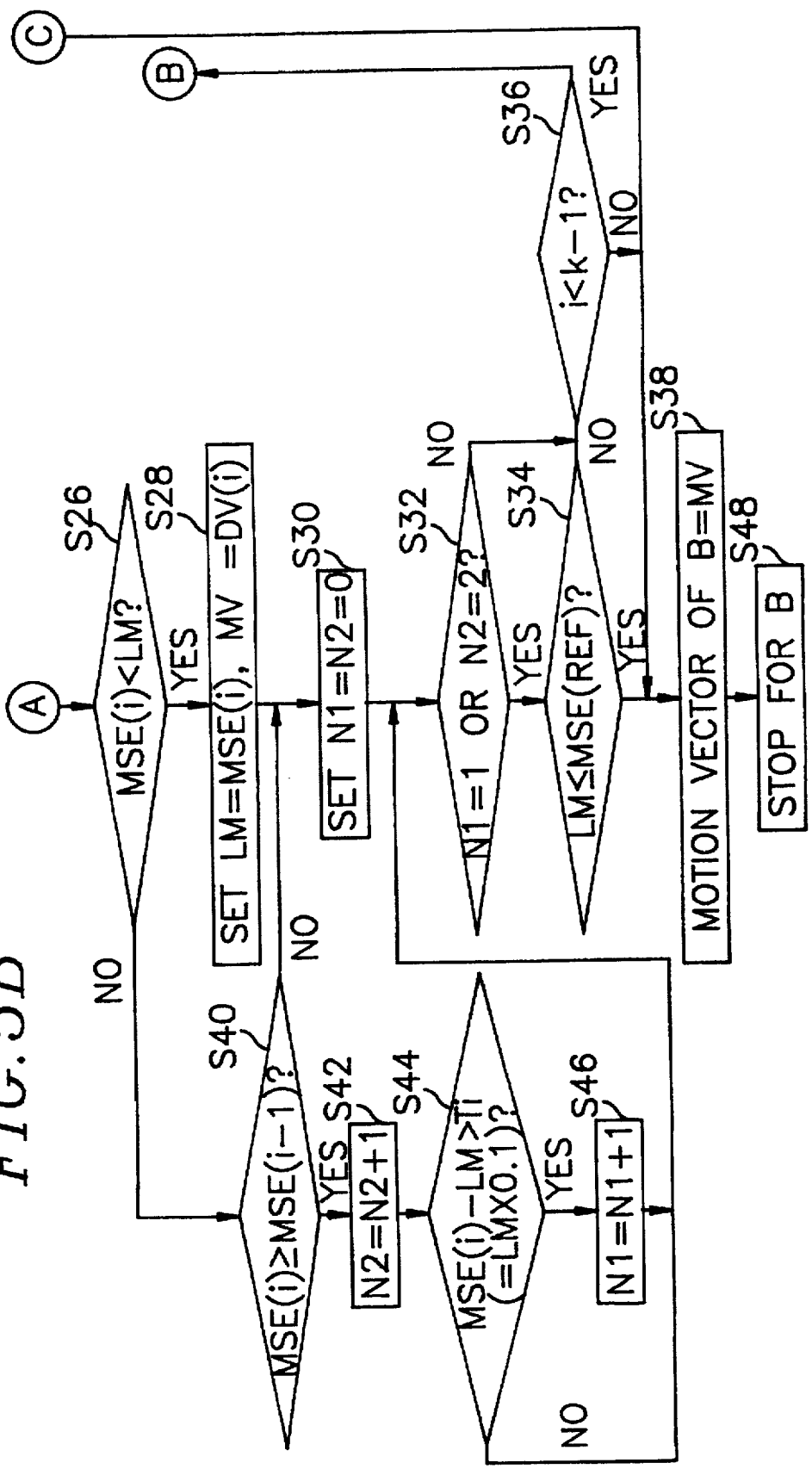

METHOD AND APPARATUS FOR DETECTING OPTIMUM MOTION VECTORS BASED ON A HIERARCHICAL MOTION ESTIMATION APPROACH

FIELD OF THE INVENTION

The present invention relates to a method and an apparatus for determining motion vectors; and, more particularly, to a method and an apparatus for determining motion vectors from two successive video frames through the use of hierarchical motion estimation approach.

DESCRIPTION OF THE PRIOR ART

As is well known, transmission of digitized video signals can deliver video images of much higher quality than the transmission of analog signals. When an image signal comprising a sequence of image "frames" is expressed in a digital form, a substantial amount of data is generated for transmission, especially in the case of a high definition television (HDTV) system. Since, however, the available frequency bandwidth of a conventional transmission channel is limited, in order to transmit the substantial amounts of digital data through the limited channel bandwidth, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM (differential pulse code modulation), two-dimensional DCT (discrete cosine transform), quantization of DCT coefficients, and VLC (variable length coding). The motion compensated DPCM is a process of determining the movement of an object between a current frame and a previous frame, and predicting the current frame according to the motion flow of the object to produce a differential signal representing the difference between the current frame and its prediction.

The two-dimensional DCT, which reduces or removes spatial redundancies between image data such as motion compensated DPCM data, converts a block of digital image data, for example, a block of 8×8 pixels, into a set of transform coefficient data. This technique is described in, e.g., Chen and Pratt, "Scene Adaptive Coder", *IEEE Transactions on Communications*, COM-32, No. 3, pp. 225-232 (March 1984). By processing such transform coefficient data with a quantizer, zigzag scanning, and VLC, the amount of data to be transmitted can be effectively compressed.

Specifically, in the motion compensated DPCM, current frame data is predicted from previous frame data based on an estimation of the motion between the current and the previous frames. Such estimated motion may be described in terms of two dimensional motion vectors representing the displacement of pixels between the previous and the current frames.

One of the methods which have been used most frequently in estimating the displacement of an object in a video sequence is the block matching algorithm. According to the block matching algorithm, a current frame is divided into a plurality of search blocks. The size of a search block typically ranges between 8×8 and 32×32 pixels. To determine a motion vector for a search block in the current frame, a similarity calculation is performed between the search block of the current frame and each of a plurality of equal-sized candidate blocks included in a generally larger search region within a previous frame. An error function such as the mean absolute error or mean square error is used to carry out a similarity measurement between the search block of the current frame and each of the candidate blocks in the search region. And a motion vector, by definition, represents the displacement between the search block and a candidate block which yields a minimum error function. Since the search block is compared with all possible candidate blocks within a search region corresponding to the search block (i.e., full search block matching), there occurs heavy computational requirement, which in turn exacts a complex hardware having the capability of very high speed processing and/or a large number of processors for real-time processing.

In light of the severe computational demands in a full search block matching procedure described above, therefore, simplified algorithms have been proposed (see, e.g., J. R. Jain et al., "Displacement Measurement and Its Application in Interframe Image Coding", *IEEE Transactions of Communications* COM-29, No. 12, pp. 1799–1808 (December 1981)). The simplified algorithm proposed therein searches for a direction of minimum distortion, wherein the search is accomplished by successively reducing the areas of search. The initial step consists of searching for a candidate block which yields a minimum error function among a set of five candidate blocks positioned at predetermined locations within a search region. After detecting a candidate block having the minimum error function, the process is repeated for another set of five candidate blocks at predetermined locations on a search area determined by the detected candidate block. The procedure is continued until the search area reduces to a size of 3×3 candidate blocks. In the final step, a candidate block which produces a minimum error function among the nine candidate blocks is determined as a most similar candidate block of a search block; and the displacement between the search block and the finally selected candidate block is asserted as a motion vector of the search block.

Although this simplified searching method may reduce the computational burden and the hardware requirement, it does not necessarily provide an optimal implementation of the block matching algorithm since the determined motion vector may reflect a candidate block having a local minimum error function rather than the most similar candidate block yielding a global minimum error function, which can be found by the full search block matching.

SUMMARY OF THE INVENTION

It is, therefore, a primary object of the present invention to provide an improved method and an apparatus for providing motion vectors by employing a hierarchical motion estimation approach with a reduced hardware requirement, wherein in each hierarchy a motion vector of a search block is searched within a predetermined search area included in a search region corresponding to the search block.

In accordance with the present invention, there is provided a method for determining motion vectors between a current frame and a preceding frame by employing a multi-tier hierarchical motion estimation, wherein the current frame is divided into a plurality of search blocks of an identical size and the preceding frame is divided into a corresponding number of search regions, each search region being further divided into a multiplicity of candidate blocks of said identical size, the candidate blocks in each search region being grouped into a multiple number of search areas of different hierarchies ranging from a highest hierarchy to a lowest hierarchy, which comprises the steps of:

(a) motion-estimating a search block with respect to the candidate blocks included in a search area of the highest hierarchy to provide a potential motion vector and a minimum error function of the highest hierarchy, said potential motion vector representing a displacement between the search block and one of the candidate blocks which yields the minimum error function;

(b) comparing the minimum error function with a threshold value of the highest hierarchy;

(c) if the minimum error function is equal to or smaller than the threshold value of the highest hierarchy, determining the potential motion vector as a motion vector of the search block, and if the minimum error function is greater than the threshold value of the highest hierarchy, calculating a reference error function, said reference error function representing a least error function obtained from a set of preset candidate blocks included in the search region corresponding to the search block;

(d) motion-estimating the search block with respect to the candidate blocks included in a search area of a lower hierarchy to provide a potential motion vector and a minimum error function of the lower hierarchy for the search block, said potential motion vector representing a displacement between the search block and one of the candidate blocks included in the search area of the lower hierarchy which yields the minimum error function;

(e) selecting a smallest error function between the minimum error functions obtained from said steps (a) and (d);

(f) repeating said steps (d) and (e) until
  (i) the selected smallest error function is smaller than a minimum error function of a hierarchy which is lower than the hierarchy yielding the smallest error function by a magnitude larger than a reference threshold; or a minimum error function for either of two consecutive hierarchies is not smaller than a minimum error function of a hierarchy which is higher than said either of two consecutive hierarchies; and
  (ii) the selected smallest error function is smaller than the reference error function, to thereby determine a potential motion vector corresponding to the selected smallest error function as a motion vector of the search block;

(g) if a motion vector of the search block is not determined in said step (f), repeating said steps (d) and (e) to the lowest hierarchy and determining a potential motion vector corresponding to the selected smallest error function as a motion vector of the search block; and (h) subjecting each of the remaining search blocks of the current frame to said steps (a) to (g).

BRIEF DESCRIPTION OF THE DRAWINGS

The above and other objects and features of the present invention will become apparent from the following description of preferred embodiments, when taken given in conjunction with the accompanying drawings, in which:

FIGS. 5A and 5B describe a procedure for determining a motion vector of a search block.

DETAILED DESCRIPTION OF THE PREFERRED EMBODIMENTS

Figure 1:
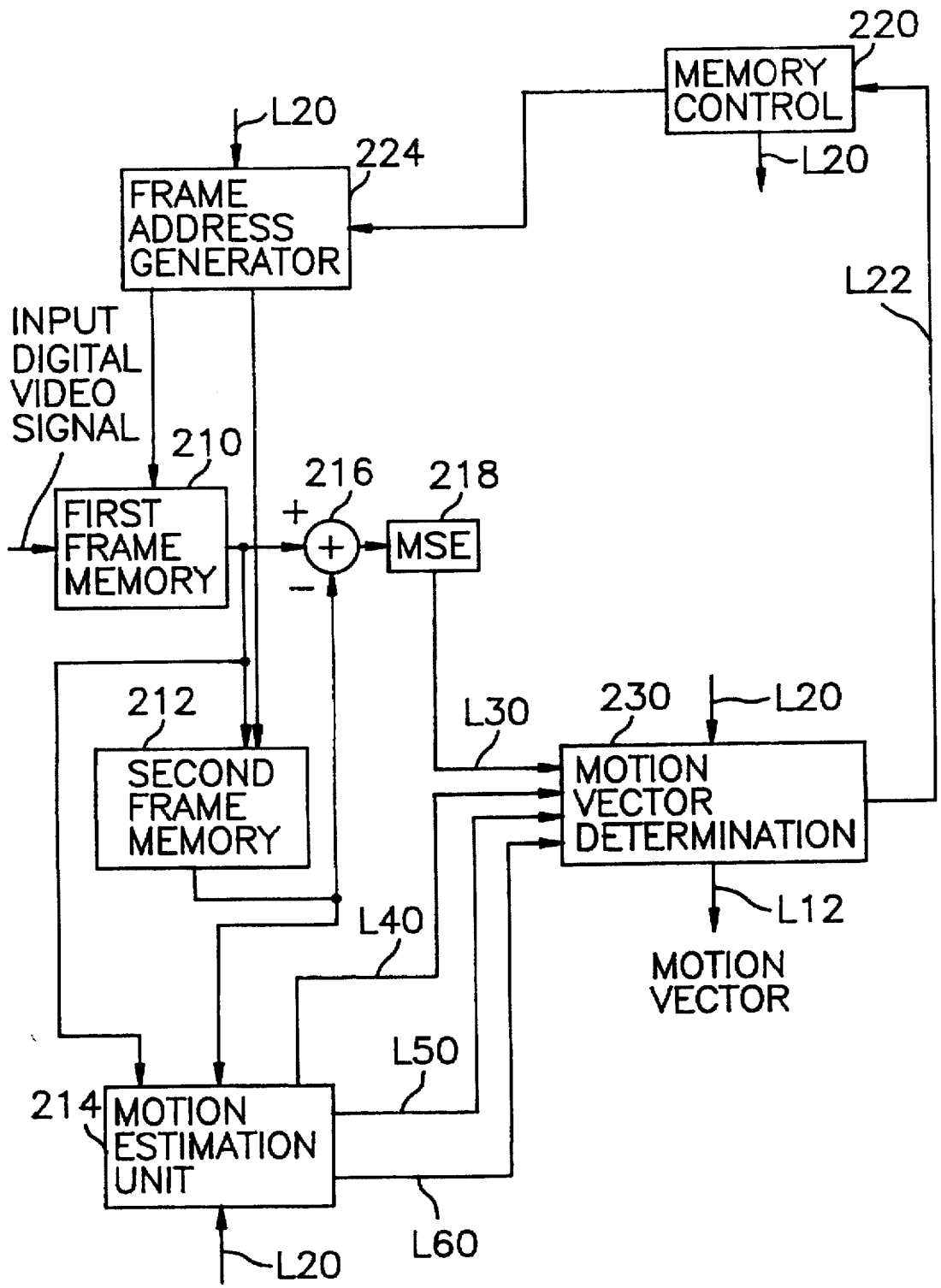
FIG. 1 shows a block diagram of the motion estimator of the present invention.

Referring to FIG. 1, there is shown a block diagram of a motion estimator of the present invention.

A digital video signal is inputted to a first frame memory 210 as a current frame and to a second frame memory 212 as a previous frame. Actually, the input digital video signal is read, on a block-by-block basis, from an input memory (not shown) wherein each frame of video signals is stored as successive blocks of pixel data for processing on a block-by-block basis. The block size of the input digital video signal typically ranges between 8×8 and 32×32 pixels. According to the conventional block matching algorithm, a current frame is divided into a plurality of search blocks of an identical size, e.g., 16×16 pixels. To determine a motion vector for a search block, a similarity calculation is carried out between the search block and each of a multiple number of equal-sized candidate blocks included in a generally larger search region within a previous frame to find a best matching block, the search region being defined by a predetermined search range, e.g., of ±12 pixels in the horizontal and vertical directions.

On the other hand, in the present invention, motion estimation for a search block within the current frame is carried out by grouping candidate blocks within a search region into a multiplicity of, e.g., 7, hierarchical search areas.

Figure 3:
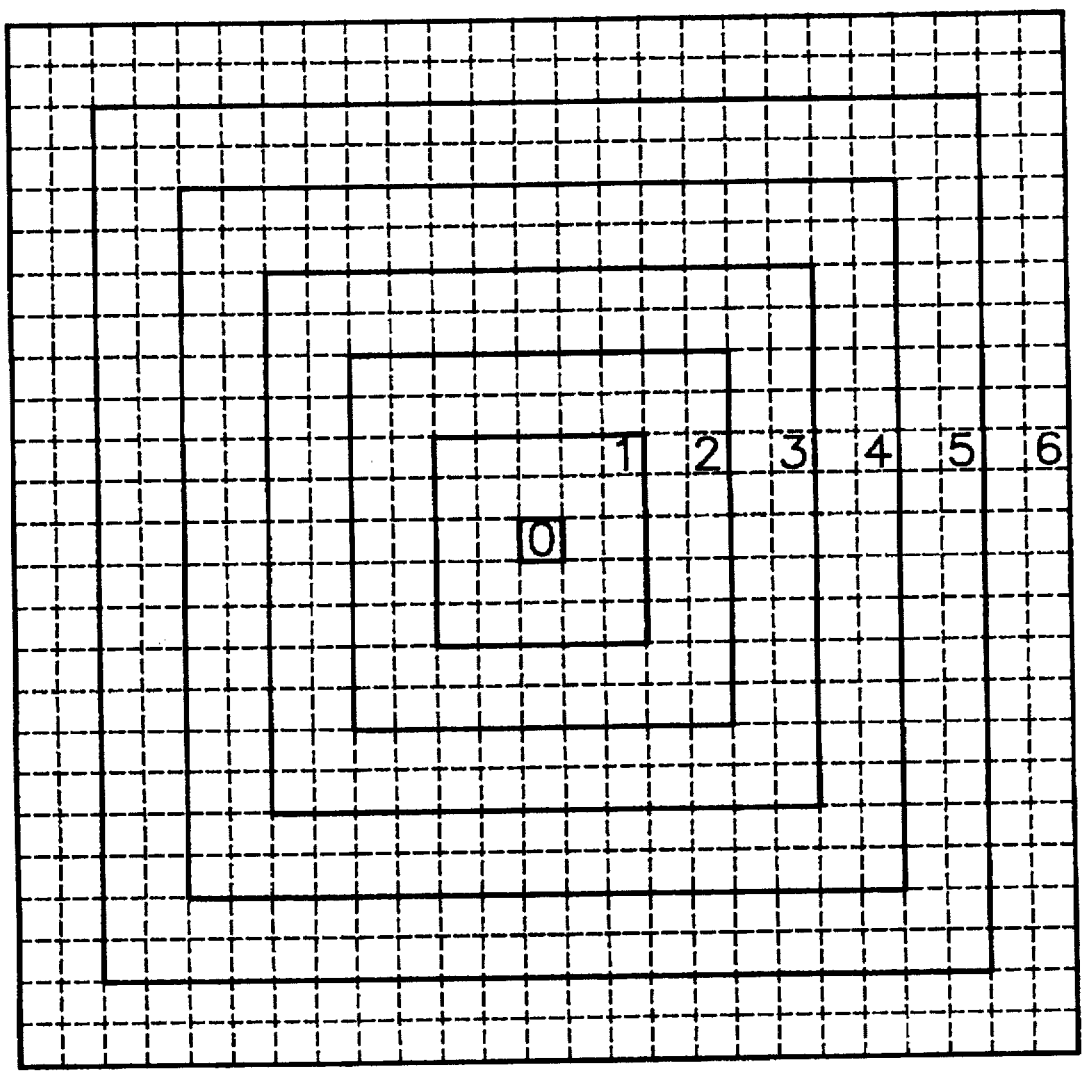
FIG. 3 depicts an exemplary structure of the hierarchical search areas employed in the present invention.

Referring to FIG. 3, there is depicted an exemplary drawing for representing hierarchical search areas employed in the inventive motion estimation approach. In the drawing, a square represents, e.g., a left-top corner pixel of a candidate block included in a search region, which in turn represents a candidate block included in a search region. The search region is divided, or, in other words, the candidate blocks are grouped, into a multiplicity of, e.g., 7, search areas in order to carry out hierarchical motion estimation in accordance with the present invention, wherein numerals 0 to 6 depicted inside the search area represent the respective hierarchical levels of the search areas, with a larger number denoting a lower level. In the preferred embodiment of the invention, the level-0 search area depicted by 0 in the drawing includes one candidate block, which is located at a same position as that of the search block, and the number of candidate blocks contained in the remaining level-1 to level-6 search areas varies with each of the levels. It should be noted that the present invention can be accomplished in a number of different manners, by, e.g., constructing the respective search areas differently from those described above.

In most video pictures, a portion that contains a moving object is relatively small compared with its background which does not change from frame to frame. Moreover, although a maximum value of a motion vector is set to a large value for the quality of a picture, a considerable number of motion vectors is small in reality. As shown in FIG. 3, a higher level corresponds to a smaller value of a motion vector. Therefore, a candidate block contained in a higher level search area is more likely to be a best-matching block to the search block.

Figure 4:
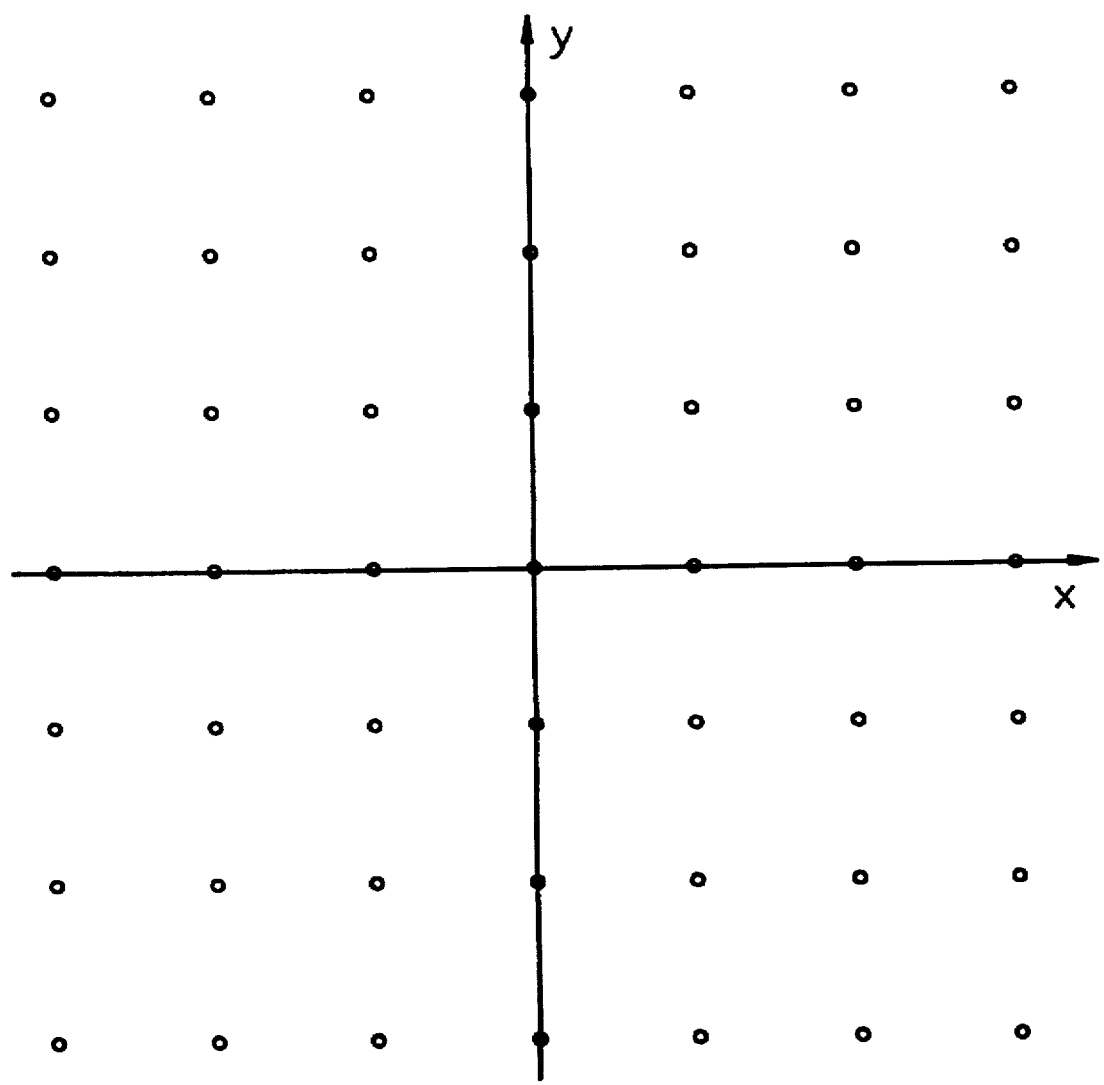
FIG. 4 represents positions of the candidate blocks used in determining a reference error function in accordance with the present invention.

In the present invention, a candidate block contained in a highest level, e.g., level-0, search area is examined first to determine whether a mean square error (MSE) between the candidate block and the search block is smaller than a predetermined threshold. If the candidate block meets the requirement, the position vector of the candidate block, e.g., (0,0), is determined as the motion vector of the search block; otherwise, candidate blocks contained in a next level are processed. Different requirements are imposed on the candidate blocks in lower level search areas. One of the requirements is that an MSE value for a motion vector should be smaller than a reference error function which is defined as a minimum among MSE values of preset candidate blocks. Referring to FIG. 4, there are provided positions of the candidate blocks used in determining the reference error function in accordance with the present invention. A set of candidate blocks different from those illustrated in FIG. 4 may be used, wherein the candidate blocks are scattered evenly in a search region.

Other requirements will be explained with reference to FIGS. 5A and 5B.

If a proper motion vector is not found in a level-1 motion estimation, a next level is processed. The procedure continues until a motion vector which meets all of the requirements is found or all levels are processed. In a typical scene, a motion vector is more likely to be found in a higher level motion estimation, as stated above. Therefore, it takes less computation time to detect a motion vector in accordance with the present invention than in a full-search block matching method.

Figure 5A:
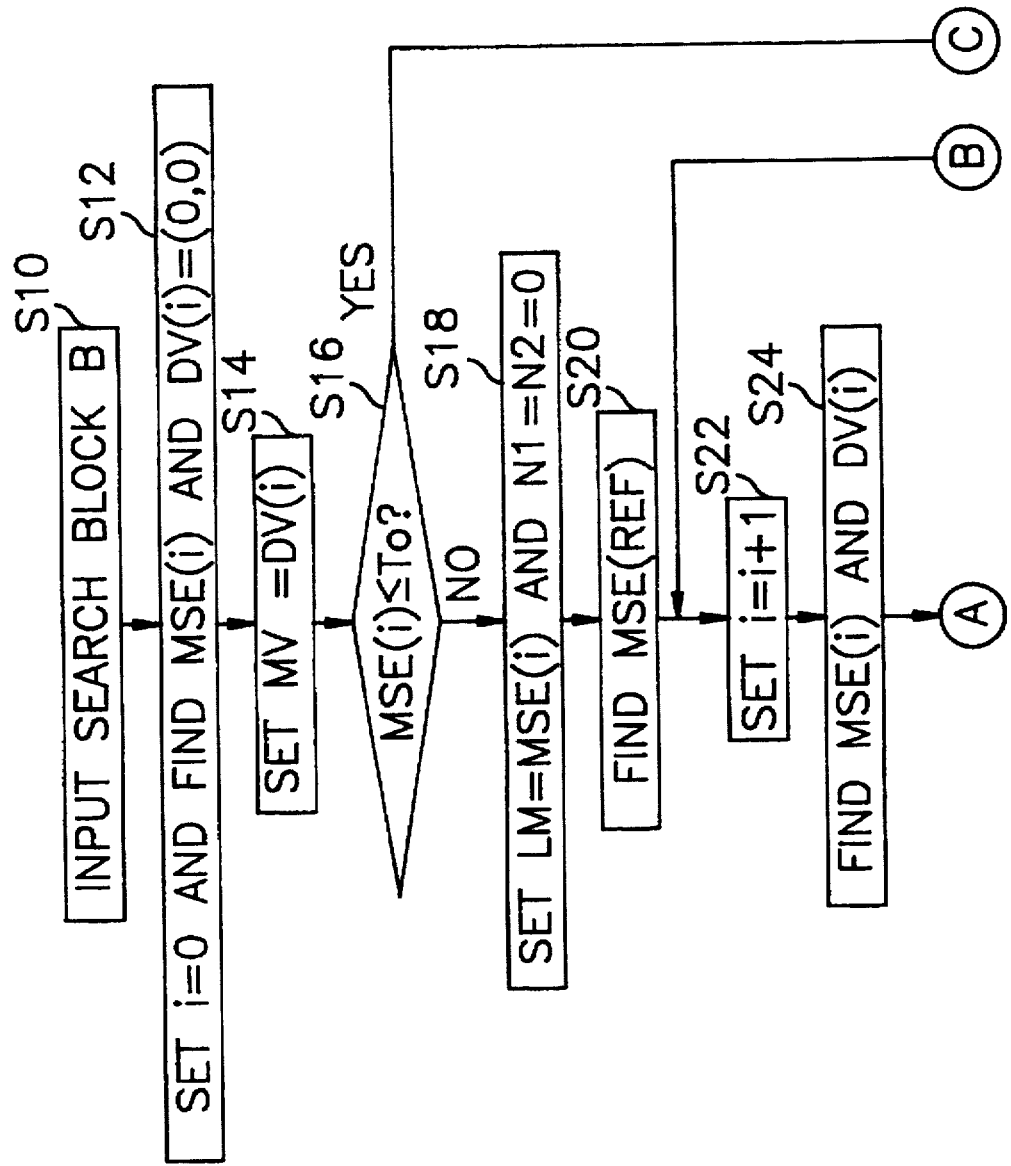

Referring to FIGS. 5A and 5B, there is shown a flow chart explaining a process for determining a motion vector of a current search block. In step S10, B, a search block to be processed is inputted. In step S12, i, which denotes a level number, is set to 0; DV(i) which denotes a position vector of a candidate block is set to (0,0); and MSE(i) is calculated. MSE(i) represents the minimum MSE of the candidate blocks contained in a level-i search area. In step S12, MSE(i) represents a minimum MSE of the candidate block in the level-0 search area, e.g., the candidate block whose position is the same as the search block. MV which represents a position vector corresponding to a smallest value of MSE is also set to (0,0) in step S14. If MSE(0) is smaller than a predetermined threshold $T_0$, the procedure for detecting the motion vector is terminated and MV value (0,0) is determined as the motion vector of the current search block.

In case MSE(i) exceeds $T_0$, prior to working with the remaining levels, values to be used in the subsequent steps are initialized in step S18. Specifically, LM which represents a smallest value of MSE is set to MSE(i); and N1 and N2 which will be used in determining a motion vector of a search block are initialized to 0. After the reference error function MSE(REF) is detected in step S20, i is increased by 1, which denotes that a next level is under process. In step S24, MSE(i), a minimum MSE of the candidate blocks contained in the level-i search area and a corresponding position vector DV(i) are detected.

Thereafter, if MSE(i), a minimum MSE of a current level, is not smaller than LM, MSE(i) is compared with MSE(i−1), a minimum MSE of a previous level in step S40. In case MSE(i) is greater than that of the previous level, N2 is increased by 1 in step S42, wherein N2 represents a number of increases of minimum MSE values between adjacent levels. Otherwise, i.e., if MSE(i) is not greater than MSE(i−1), N1 and N2 are reset to 0 in step S30. In steps S44 and S46, the difference between MSE(i) and LM is compared with a predetermined value $T_i$, and N1 is increased by 1 when the difference is larger than $T_i$.

Returning to step S26, if MSE(i) is smaller than LM, LM and MV are updated to MSE(i) and DV(i), respectively. In this case, N1 and N2 are also initialized to zero in step S30.

In steps S32 and S34, it is checked if the position vector currently contained in MV meets the requirements imposed on a motion vector of a search block. Specifically, the expression Ni=1 in step S32 denotes that the current MSE(i) value is much smaller than LM which is the smallest MSE value obtained in previous levels; N2=2 represents that the minimum MSE value increases twice between 3 adjacent levels; and the smallest MSE should not be greater than the reference error function MSE(REF).

If a minimum MSE value which meets the requirements depicted in steps S32 and S34 is found, the current value of MV is determined as a motion vector of the search block B in step S38, wherein MV represents the position vector corresponding to the current value of LM, a smallest value among the minimum MSE values of processed levels; or else, the whole procedure is repeated for a next level. The value of i varies from 0 to k−1 wherein k is the number of different levels included in a search region. If the current level is the last level, e.g., level-(k−1), in the search region, the current value of MV is determined as the motion vector as shown in steps S36 and S38.

In summary, a current value of LM, i.e., the smallest value of MSE for the processed levels, is determined as a motion vector on condition that MSE(i) increases twice between 3 adjacent levels; or the difference between a current MSE(i) and LM is larger than $T_i$. These requirements are imposed to make sure that LM is not a local minimum of MSE. By doing so, an exact motion vector which yields a smallest MSE can be found without dealing with all the candidate blocks contained in a search region. The requirement about the reference error function also lessens the possibility of falling into a local minimum.

In an other preferred embodiment of the present invention, the step S40 may be skipped without seriously affecting the correctness of a motion vector. The condition considered in step S40 is to make sure that a local minimum should not be determined as a smallest MSE value by excluding the case that MSE(i) increases in a level and then decreases in a next level. However, the possibility of falling into a local minimum is low, considering the computational complexity entailed by inserting step S40. Without step S40, N2 is increased by 1 only if MSE(i) is larger than LM; and if two consecutive MSE values, e.g., MSE(m) and MSE(m+1) are larger than LM, N2 is set to 2 even if MSE(m+1) is smaller than MSE(m).

Referring back to FIG. 1, the inventive hierarchical motion estimation of the current frame is initiated by motion-estimating a search block with respect to its corresponding level-0 search area. In order to carry out a level-0 motion estimation, a memory control 220 issues position data for the search block and the level-0 information on a line L20 to a frame address generator 224.

Subsequently, in response to the position data and the level-0 information on the line L20, the frame address generator 224 provides the first and the second frame memories 210 and 212 with address data for the search block and a candidate block in the corresponding level-0 search area, respectively. At an adder 216, pixel data of the candidate block retrieved from the second frame memory 212 is subtracted from that of the search block retrieved from the first frame memory 210; and the resultant data, i.e., a difference signal therebetween, is fed to an MSE block 218, wherein an MSE of the difference signal is calculated. The MSE for the candidate block is then applied to a motion vector determination block 230 on a line L30, to determine if a motion vector of the search block is found in the level-0 motion estimation, as described in step S16 of FIG. 5A.

Figure 2:
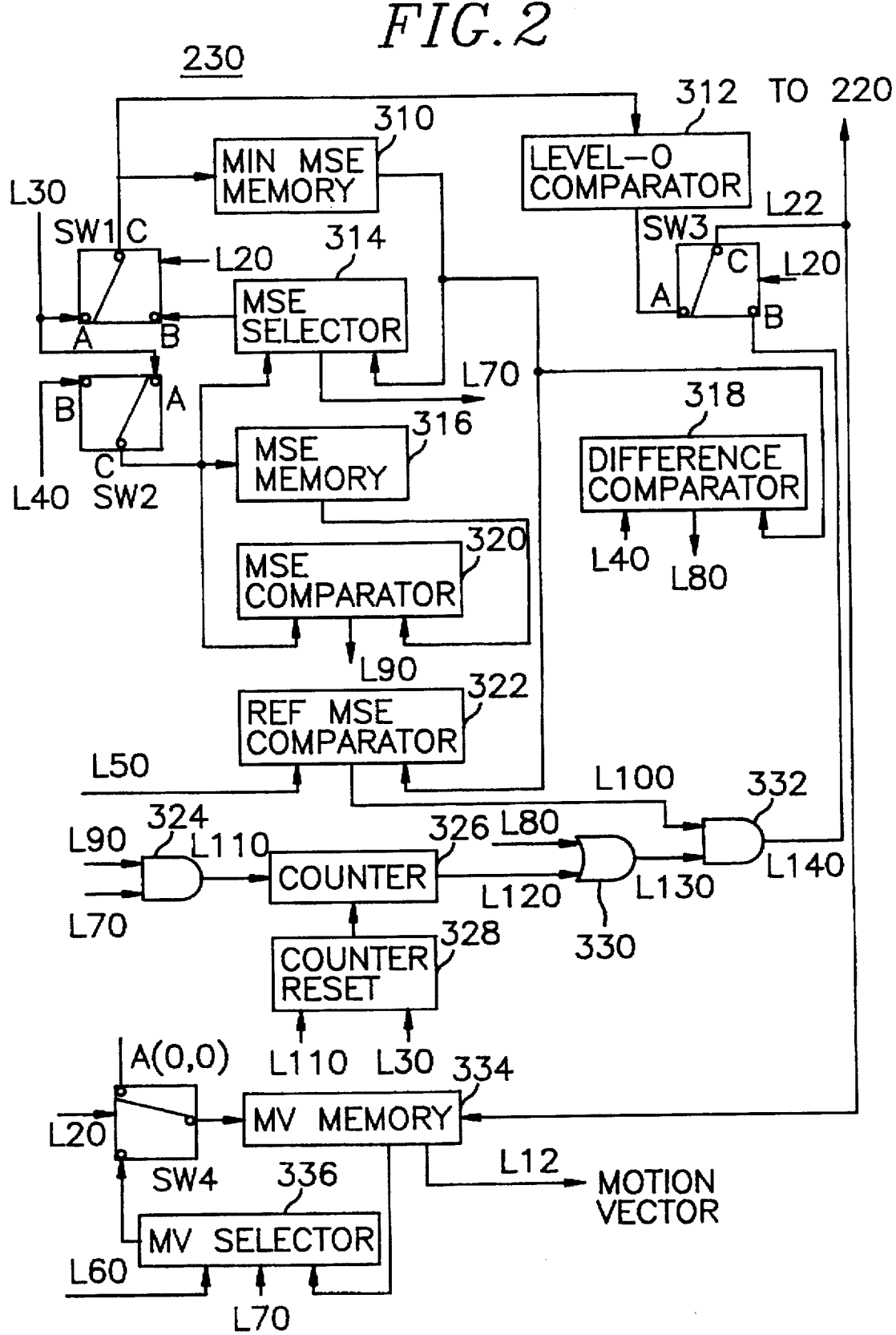
FIG. 2 provides a detailed block diagram of the motion vector determination block shown in FIG. 1.

Referring to FIG. 2, there is a detailed block diagram of the motion vector determination block 230 shown in FIG. 1. The minimum MSE of level-0 on the line L30 is applied to input terminals A of switches SW1 and SW2, which couple the input terminals A to their output terminals C in response to the level-0 information on the line L20. The minimum MSE of level-0 is then coupled to a MIN MSE memory 310 which stores LM, to a level-0 comparator 312 and to an MSE memory 316. In the meantime, an input and an output terminals A and C of a switch SW4 are also coupled together by the level-0 information on the line L20, enabling a zero valued motion vector on the input terminal A to be fed to a MV memory 334 wherein the zero valued motion vectors are stored therein as potential motion vectors for the current search block.

At the level-0 comparator 312, the level-0 MSE value is compared with the predetermined threshold value $T_0$. The threshold value can be adjusted in accordance with the characteristics of the input digital video signal, e.g., a variance thereof.

The level-0 comparator 312 of the present invention provides a logic high comparison signal to SW3, if the MSE value on the output terminal C of the switch SW1 is larger than the threshold value and logic low comparison signal, otherwise. The comparison signal is coupled to the memory control 220 shown in FIG. 1 and to the MV memory 334 in response to the level-0 information on the line L20 via an output terminal C of SW3. The logic high comparison signal signifies that the level-0 motion estimation terminates without finding a motion vector for the search block.

Turning now back to FIG. 1, if the level-0 motion estimation finishes without finding a motion vector of the search block, in response to the logic high comparison signal, the frame address generator 224 generates to the first and the second frame memories 210 and 212 address data for retrieving pixel data of the search block and reference blocks, respectively. By employing a conventional motion estimation technique, a motion estimation unit 214 then performs a motion estimation of the search block based on the pixel data of the search block from the first frame memory 210 and those for the reference blocks, to thereby provide a reference error function to the motion vector determination block 230 on a line L50 as shown in step S20 of FIG. 5A. The reference error function is coupled to a REF MSE comparator 322 shown in FIG. 5.

Upon completing the motion estimation for the reference blocks, the memory control 220 provides level-1 information on the line L20. In response to the level-1 information on the line L20, the frame address generator 224 generates to the first and the second frame memories 210 and 212 address data for retrieving pixel data of the search block and candidate blocks within a corresponding level-1 search area of the search block, respectively. The motion estimation unit 214 then performs the level-1 motion estimation of the search block based on the pixel data of the search block from the first frame memory 210 and those for the candidate blocks in the corresponding level-1 search area, to thereby provide a minimum MSE of level-1 and a corresponding level-1 motion vector of the search block to the motion vector determination block 230 on lines L40 and L60, respectively. At the motion vector determination block 230, the minimum MSE of level-1 is checked to see if the motion vector of the search block is found as described with reference to FIG. 4B.

Specifically, the minimum MSE of level-1 on the line L40 is applied to the input terminal A of switch SW2, which couples the input terminal A to its output terminal C in response to the level-1 information on the line L20. The minimum MSE of level-1 is then coupled to a MSE selector 314, to the MSE memory 316 and to a MSE comparator 320. The corresponding level-1 motion vector is also coupled to a MV selector 336 on a line L60.

The MSE selector 314 then compares the minimum MSE of level-1 with the minimum MSE of level-0, which is retrieved from the MIN MSE memory 310; and selects a smaller MSE value between the two to provide the selected MSE value to the input terminal B of the switch SW1 and a selection signal representing the selected MSE value to the MV selector 336 on a line L70. MSE(1), a minimum MSE of a current level, is compared with MSE(0), a minimum MSE of a previous level in the MSE comparator 320, as shown in S40 of FIG. 4B. In case MSE(1) is greater than that of the previous level, a line L90 and a line L110 connected thereto by an AND gate 324 are held logic high; and N2 stored in a counter 326 is increased by 1. Otherwise, i.e., if MSE(1) is not greater than MSE(0), N2 is reset to 0 by a counter reset 328. The counter 326 issues a logic high signal on a line L120 when N2 is 2. The difference between MSE(1) and LM is compared with a predetermined threshold $T_i$ at a difference comparator 318 and the logic high signal is issued on a line L80 to an OR gate 330, when the difference is larger than $T_i$, wherein L80 denotes the value of N1. A line L130 is held logic high when N1 is 1 or N2 is 2. A line L140 is kept logic high when the line L130 is high and the MSE value stored in the MIN MSE memory 310 is smaller than the reference error function. In response to the logic high signal on L140, a motion vector of the search block is provided from the MV memory 334 on a line L12. The logic high signal is also coupled to the memory control 220 via SW3 to notify that the motion vector for the search block is found and to make it ready for processing a next search block.

In case L140 is held low, a next level is processed in a similar manner as is done for the level-1 motion estimation except that the motion estimation is performed at the motion estimation unit 214 with respect to the corresponding search areas of their respective levels. Subsequent levels are processed until the motion vector for the search block is found or all the levels are processed.

In said another preferred embodiment of the present invention discussed above, the apparatus shown in FIG. 2 is modified to perform the procedure without step S40 of FIG. 5B. Specifically, the MSE memory 316 stores a minimum MSE value of the previous level and the MSE comparator 320 compares the value with that of the current level. Therefore, the MSE memory 316, the MSE comparator 320 and the OR gate 324 can be deleted.

While the present invention has been described with respect to the particular embodiments, it will be apparent to those skilled in the art that various changes and modifications may be made without departing from the spirit and scope of the invention as defined in the following claims.

What is claimed is:

1. A method for determining motion vectors between a current frame and a preceding frame by employing a multi-tier hierarchical motion estimation, wherein the current frame is divided into a plurality of search blocks of an identical size and the preceding frame is divided into a corresponding number of search regions, each search region being further divided into a multiplicity of candidate blocks of said identical size, the candidate blocks in each search region being grouped into a multiple number of search areas of different hierarchies ranging from a highest hierarchy to a lowest hierarchy, which comprises the steps of:

(a) motion-estimating a search block with respect to the candidate blocks included in a search area of the highest hierarchy to provide a potential motion vector and a minimum error function of the highest hierarchy, said potential motion vector representing a displacement between the search block and one of the candidate blocks which yields the minimum error function;

(b) comparing the minimum error function with a threshold value of the highest hierarchy;

(c) if the minimum error function is equal to or smaller than the threshold value of the highest hierarchy, determining the potential motion vector as a motion vector of the search block, and if the minimum error function is greater than the threshold value of the highest hierarchy, calculating a reference error function, said reference error function representing a least error function obtained from a set of preset candidate blocks included in the search region corresponding to the search block;

(d) motion-estimating the search block with respect to the candidate blocks included in a search area of a lower hierarchy to provide a potential motion vector and a minimum error function of the lower hierarchy for the search block, said potential motion vector representing a displacement between the search block and one of the candidate blocks included in the search area of the lower hierarchy which yields the minimum error function;

(e) selecting a smallest error function between the minimum error functions obtained from said steps (a) and (d);

(f) repeating said steps (d) and (e) until
  (i) the selected smallest error function is smaller than a minimum error function of a hierarchy which is lower than the hierarchy yielding the smallest error function by a magnitude larger than a reference threshold; or a minimum error function for either of two consecutive hierarchies is not smaller than a minimum error function of a hierarchy which is higher than said either of two consecutive hierarchies; and
  (ii) the selected smallest error function is smaller than the reference error function, to thereby determine a potential motion vector corresponding to the selected smallest error function as a motion vector of the search block;

(g) if a motion vector of the search block is not determined in said step (f), determining a potential motion vector corresponding to the selected smallest error function as a motion vector of the search block; and (h) subjecting each of the remaining search blocks of the current frame to said steps (a) to (g).

2. The method according to claim 1, wherein the search area of the highest hierarchy consists of one candidate block.

3. The method according to claim 2, wherein the threshold value of the highest hierarchy is of a predetermined value and the reference threshold value is determined based on the selected smallest error function.

4. A method for determining motion vectors between a current frame and a preceding frame by employing a multi-tier hierarchical motion estimation, wherein the current frame is divided into a plurality of search blocks of an identical size and the preceding frame is divided into a corresponding number of search regions, each search region being further divided into a multiplicity of candidate blocks of said identical size, the candidate blocks in each search region being grouped into a multiple number of search areas of different hierarchies ranging from a highest hierarchy to a lowest hierarchy, which comprises the steps of:

(a) motion-estimating a search block with respect to the candidate blocks included in a search area of the highest hierarchy to provide a potential motion vector and a minimum error function of the highest hierarchy, said potential motion vector representing a displacement between the search block and one of the candidate blocks which yields the minimum error function;

(b) comparing the minimum error function with a threshold value of the highest hierarchy;

(c) if the minimum error function is equal to or smaller than the threshold value of the highest hierarchy, determining the potential motion vector as a motion vector of the search block, and if the minimum error function is greater than the threshold value of the highest hierarchy, calculating a reference error function, said reference error function representing a least error function obtained from a set of preset candidate blocks included in the search region corresponding to the search block;

(d) motion-estimating the search block with respect to the candidate blocks included in a search area of a lower hierarchy to provide a potential motion vector and a minimum error function of the lower hierarchy for the search block, said potential motion vector representing a displacement between the search block and one of the candidate blocks included in the search area of the lower hierarchy which yields the minimum error function;

(e) selecting a smallest error function between the minimum error functions obtained from said steps (a) and (d);

(f) repeating said steps (d) and (e) until
  (i) the selected smallest error function is smaller than a minimum error function of a hierarchy which is lower than the hierarchy yielding the smallest error function by a magnitude larger than a reference threshold; or the selected smallest error function is smaller than a minimum error function of either of two consecutive hierarchies which are lower than the hierarchy yielding the smallest error function; and
  (ii) the selected smallest error function is smaller than the reference error function, to thereby determine a potential motion vector corresponding to the selected smallest error function as a motion vector of the search block;

(g) if a motion vector of the search block is not determined in said step (f), determining a potential motion vector corresponding to the selected smallest error function as a motion vector of the search block; and (h) subjecting each of the remaining search blocks of the current frame to said steps (a) to (g).

5. The method according to claim 4, wherein the search area of the highest hierarchy consists of one candidate block.

6. The method according to claim 5, wherein the threshold value of the highest hierarchy is of a predetermined value and the reference threshold value is determined based on the selected smallest error function.

7. An apparatus for determining motion vectors between a current frame and a preceding frame by employing a multi-tier hierarchical motion estimation, wherein the current frame is divided into a plurality of search blocks of an identical size and the preceding frame is divided into a corresponding number of search regions, each search region being further divided into a multiplicity of candidate blocks of said identical size, the candidate blocks in each search region being grouped into a multiple number of search areas of different hierarchies ranging from a highest hierarchy to a lowest hierarchy, comprising:

(a) means for motion-estimating a search block with respect to the candidate blocks included in a search area of the highest hierarchy to provide a potential motion vector and a minimum error function of the highest hierarchy, said potential motion vector representing a displacement between the search block and one of the candidate blocks which yields the minimum error function;

(b) means for comparing the minimum error function with a threshold value of the highest hierarchy;

(c) means for, if the minimum error function is equal to or smaller than the threshold value of the highest hierarchy, determining the potential motion vector as a motion vector of the search block, and if the minimum error function is greater than the threshold value of the highest hierarchy, calculating a reference error function, said reference error function representing a least error function obtained from a set of preset candidate blocks included in the search region corresponding to the search block;

(d) means for motion-estimating the search block with respect to the candidate blocks included in a search area of a lower hierarchy to provide a potential motion vector and a minimum error function of the lower hierarchy for the search block, said potential motion vector representing a displacement between the search block and one of the candidate blocks included in the search area of the lower hierarchy which yields the minimum error function;

(e) means for selecting a smallest error function between the minimum error functions obtained from said means (a) and (d);

(f) means for repeating the operation of the means (d) and (e) until (i) the selected smallest error function is smaller than a minimum error function of a hierarchy which is lower than the hierarchy yielding the smallest error function by a magnitude larger than a reference threshold; or a minimum error function for either of two consecutive hierarchies is not smaller than a minimum error function of a hierarchy which is higher than said either of two consecutive hierarchies; and (ii) the selected smallest error function is smaller than the reference error function, to thereby determine a potential motion vector corresponding to the selected smallest error function as a motion vector of the search block;

(g) means for, if a motion vector of the search block is not determined in said means (f), determining a potential motion vector corresponding to the selected smallest error function as a motion vector of the search block; and (h) means for subjecting each of the remaining search blocks of the current frame to means (a) to (g).

8. The apparatus according to claim 7, wherein the search area of the highest hierarchy consists of one candidate block.

9. The apparatus according to claim 8, wherein the threshold value of the highest hierarchy is of a predetermined value and the reference threshold value is determined based on the selected smallest error function.

10. An apparatus for determining motion vectors between a current frame and a preceding frame by employing a multi-tier hierarchical motion estimation, wherein the current frame is divided into a plurality of search blocks of an identical size and the preceding frame is divided into a corresponding number of search regions, each search region being further divided into a multiplicity of candidate blocks of said identical size, the candidate blocks in each search region being grouped into a multiple number of search areas of different hierarchies ranging from a highest hierarchy to a lowest hierarchy, comprising:

(a) means for motion-estimating a search block with respect to the candidate blocks included in a search area of the highest hierarchy to provide a potential motion vector and a minimum error function of the highest hierarchy, said potential motion vector representing a displacement between the search block and one of the candidate blocks which yields the minimum error function;

(b) means for comparing the minimum error function with a threshold value of the highest hierarchy;

(c) means for, if the minimum error function is equal to or smaller than the threshold value of the highest hierarchy, determining the potential motion vector as a motion vector of the search block, and if the minimum error function is greater than the threshold value of the highest hierarchy, calculating a reference error function, said reference error function representing a least error function obtained from a set of preset candidate blocks included in the search region corresponding to the search block;

(d) means for motion-estimating the search block with respect to the candidate blocks included in a search area of a lower hierarchy to provide a potential motion vector and a minimum error function of the lower hierarchy for the search block, said potential motion vector representing a displacement between the search block and one of the candidate blocks included in the search area of the lower hierarchy which yields the minimum error function;

(e) means for selecting a smallest error function between the minimum error functions obtained from said means (a) and (d);

(f) means for repeating the operation of the means of (d) and (e) until (i) the selected smallest error function is smaller than a minimum error function of a hierarchy which is lower than the hierarchy yielding the smallest error function by a magnitude larger than a reference threshold; or the selected smallest error function is smaller than a minimum error function of either of two consecutive hierarchies which are lower than the hierarchy yielding the smallest error function; and (ii) the selected smallest error function is smaller than the reference error function, to thereby determine a potential motion vector corresponding to the selected smallest error function as a motion vector of the search block;

(g) means for, if a motion vector of the search block is not determined in the means (f), determining a potential motion vector corresponding to the selected smallest error function as a motion vector of the search block; and (h) means for subjecting each of the remaining search blocks of the current frame to said means (a) to (g).

11. The apparatus according to claim 10, wherein the search area of the highest hierarchy consists of one candidate block.

12. The apparatus according to claim 11, wherein the threshold value of the highest hierarchy is of a predetermined value and the reference threshold value is determined based on the selected smallest error function.

* * * * *